Patented Aug. 14, 1928.

1,680,408

UNITED STATES PATENT OFFICE.

ARTHUR L. BROWN, OF WILKINSBURG, PENNSYLVANIA, ASSIGNOR TO WESTINGHOUSE ELECTRIC & MANUFACTURING COMPANY, A CORPORATION OF PENNSYLVANIA.

CONDENSATION PRODUCT AND METHOD OF MAKING THE SAME.

No Drawing. Application filed February 23, 1922. Serial No. 538,748.

This invention relates to phenolic condensation products, more particularly to condensation products including a phenolic body, formaldehyde and an oil and to methods of making the same.

In my Patent #1,212,738, I have described a new type of phenolic condensation product consisting of the product of reaction of a phenolic body, formaldehyde, China wood oil and a lead-manganese drier. This material, although generally adaptable to the various uses to which phenolic condensation products are applied, is especially suited for use as a baking, insulating enamel.

I have further discovered, as set forth in my copending application, Serial No. 412,564, filed September 24, 1920, that, by changing the proportions of the ingredients of my new condensation product, I so improve the properties thereof that the material is especially adapted for use in impregnating fibrous material which is later consolidated into a unitary mass to provide various articles, such as punch plate for electrical and other purposes.

I have now discovered that compositions having substantially the same properties as those described in the above-identified patent and pending application may be obtained much more readily than therein set forth, it being among the objects of this invention to produce phenolic condensation products in a simple and efficient manner.

In practicing my invention, I utilize a phenolic body, formaldehyde or its equivalent, and cause the same to react by means of a catalyst which comprises, broadly, an organic material which is acid in character. Specifically, I prefer to use China wood oil as the catalytic agent, the fatty acids in the oil exerting a catalytic action on the materials entering into the reaction. Ordinarily, I add an excess of China wood oil in order that the oil may exert its modifying influence on the finished product in addition to the acids therein acting as catalytic agents for the reaction.

The process herein described is simpler than those described in my above-identified patent and application, since I am enabled to use raw China wood oil and omit the drier. The yield of the final product is higher than in these cases; generally, I am able to obtain a 10% greater yield with my present process.

The following is a detailed description which illustrates the production of my condensation product in accordance with this invention: Four parts by weight of cresol and one part by weight of raw China wood oil are mixed and heated to 110° C. Three parts by weight of a 40% solution of formaldehyde are then added and the mixture heated to boiling in a vacuum kettle having a condenser attached thereto. The cresol-China wood oil mixture, while at 110° C. is emptied, by means of a pipe connection with vacuum kettle, into said kettle while the formaldehyde solution is boiling, and the reaction is allowed to proceed at 93 to 98° C. for 80 minutes. The condenser is then disconnected, vacuum is applied (about a 25 to 26" vacuum) for about 2 to 2½ hours, or until substantially all the water has been eliminated and the product is at 97-98° C. The material is then removed from the vacuum kettle, and is placed in a suitable open kettle, and is held at about 100° C. for about 10 hours or until it is unsafe to maintain this heat longer on account of the proximity of the insoluble stage of the product.

I believe a new composition of matter is formed, as a peculiar odor is noticeable after long heating at 100° C., and the product, if left for months in an open vessel, without any thinner in it, shows no tendency to oxidize. If the China wood oil had not been chemically changed in the process, oxidation would set in and at least the surface of the material would manifest this fact by becoming insoluble in solvents, similar to oxidized China wood oil.

The final product may be dissolved in suitable solvents, preferably with the aid of heat to hasten solution thereof. The material is soluble in coal tar solvents, such as benzol, toluol, heavy naphtha and the like. It is also soluble in turpentine, mixtures of benzol and alcohol, and mixtures of heavy naphtha and kerosene. The material may, in the dissolved state, be used for impregnating fibrous material, such as paper, for molding purposes or it may be used as an air-drying varnish or as a baking enamel.

By omitting the drier which I had hitherto considered essential in forming my condensation product, I am enabled to utilize a temperature of as high as 150° C. during the reaction without any danger of the material reacting to form the insoluble condensation product. The reaction is more moderate and may be more easily controlled than when the drier is used in conjunction with the China wood oil. My new material may be molded at 180° C. At this temperature it becomes infusible in a very short time, thus facilitating the molding operation.

Although I have described my invention, and setting forth details of manipulation and specific proportions of ingredients, it is obvious that various changes may be made in such details within the scope of my invention. For instance, I may change the proportions of China wood oil in the product, depending upon the use to which the product is to be put. I may increase the proportion of oil, affecting the mechanical strength thereof somewhat, but greatly increasing the electrical properties of the material. I am not necessarily limited to the use of China wood oil in my product but similar oils of a vegetable origin containing free fatty acids or bodies acid in character may be substituted therefor. Any of the well known equivalents of cresol or formaldehyde may be substituted therefor in my process.

I claim as my invention:

1. A resinous phenolic condensation product resulting from reacting a mixture consisting of a phenol, a substance containing an active methylene group and China wood oil.

2. A resinous phenolic condensation product resulting from reacting a mixture consisting of a phenol, a substance containing an active methylene group and raw China wood oil.

3. A resinous phenolic condensation product resulting from reacting a mixture consisting of a phenol, a substance containing an active methylene group and the organic acid constituents of China wood oil.

4. A resinous phenolic condensation product resulting from reacting a mixture consisting of a phenol, a substance containing an active methylene group and the fatty acid constituents of China wood oil.

5. A resinous phenolic condensation product resulting from reacting a mixture consisting of a phenol, a substance containing an active methylene group and the fats and fatty acid constituents of China wood oil.

6. A method of making resinous phenolic condensation products which comprises mixing a phenolic body, formaldehyde and the organic acid constituents of China wood oil and causing the same to react.

7. A method of making resinous phenolic condensation products which comprises mixing a phenolic body, formaldehyde and the organic acids present in China wood oil and causing the same to react with the application of heat.

8. A method of making resinous phenolic condensation products which comprises mixing a phenolic body, formaldehyde and the fatty acid constituents of China wood oil and causing the same to react with the application of heat.

9. A method of making resinous phenolic condensation products which comprises mixing a phenolic body, formaldehyde and a mixture of fatty acid constituents of China wood oil and causing the same to react with the application of heat.

10. A method of making resinous phenolic condensation products which comprises mixing a phenolic body, formaldehyde and a mixture of fatty acids with fats contained in China wood oil and causing the same to react with the application of heat.

11. A method of making resinous phenolic condensation products which comprises mixing a phenolic body, formaldehyde and China wood oil and causing the same to react with the application of heat.

12. A method of making resinous phenolic condensation products which comprises mixing a phenolic body, formaldehyde and raw China wood oil and causing the same to react with the application of heat.

13. The method of making a resinous phenolic condensation product comprising mixing about four parts of a phenolic body and one part of China wood oil, adding a sufficient amount of formaldehyde to form a viscous resinous mass when reacted with said phenolic body and oil and then heating.

14. The method of making a resinous phenolic condensation product comprising mixing a phenolic body, China wood oil, and a substance containing an active methylene group, heating said mixture to about 95° C. to effect an initial condensation, removing the water by boiling at a temperature less than 100° C. and then heating the water free mass to about 100° C. for a time sufficient to form a viscous resinous body, but insufficient to form an insoluble resin.

15. The method of making a resinous phenolic condensation product comprising mixing four parts of cresol and one part of China wood oil, adding a sufficient amount of formaldehyde to form a viscous resinous mass when reacted with said phenolic body and oil and then heating.

In testimony whereof, I have hereunto subscribed my name this 17th day of February 1922.

ARTHUR L. BROWN.